Aug. 8, 1939.　　　　　C. AALBORG　　　　　2,169,014
FOOD MIXER
Filed May 27, 1936　　　　　6 Sheets-Sheet 1

WITNESSES:
C. J. Weller.
W. H. Whitten

INVENTOR
Christian Aalborg.
BY
W. R. Coley
ATTORNEY

Aug. 8, 1939.  C. AALBORG  2,169,014
FOOD MIXER
Filed May 27, 1936   6 Sheets—Sheet 4

WITNESSES:

INVENTOR
Christian Aalborg.
BY
ATTORNEY

Aug. 8, 1939.  C. AALBORG  2,169,014
FOOD MIXER
Filed May 27, 1936  6 Sheets-Sheet 5
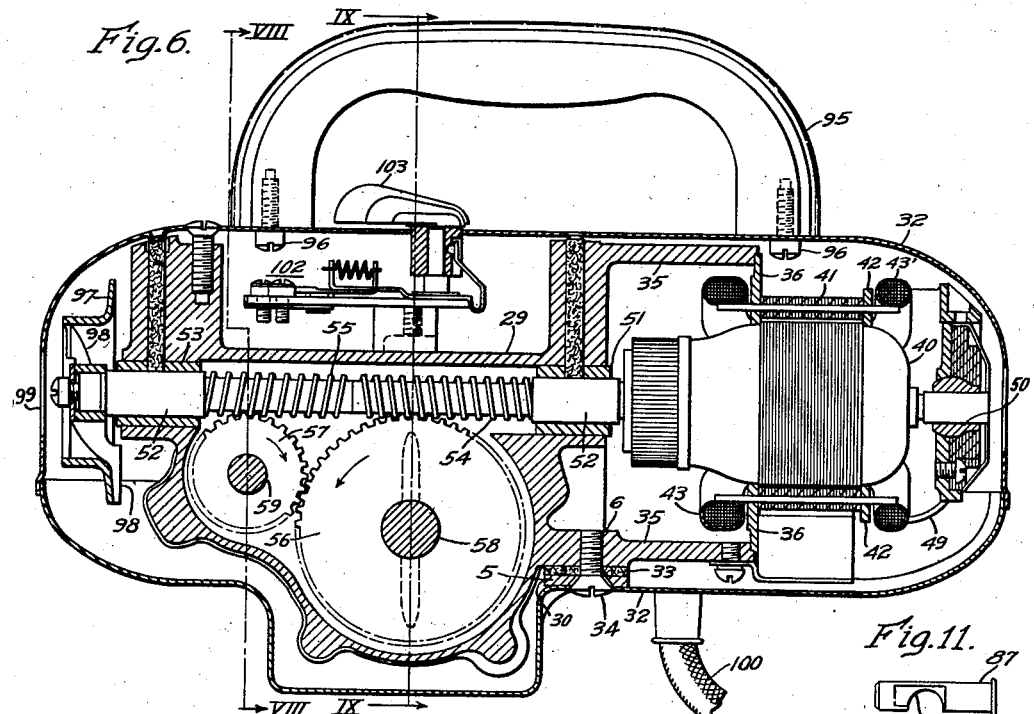
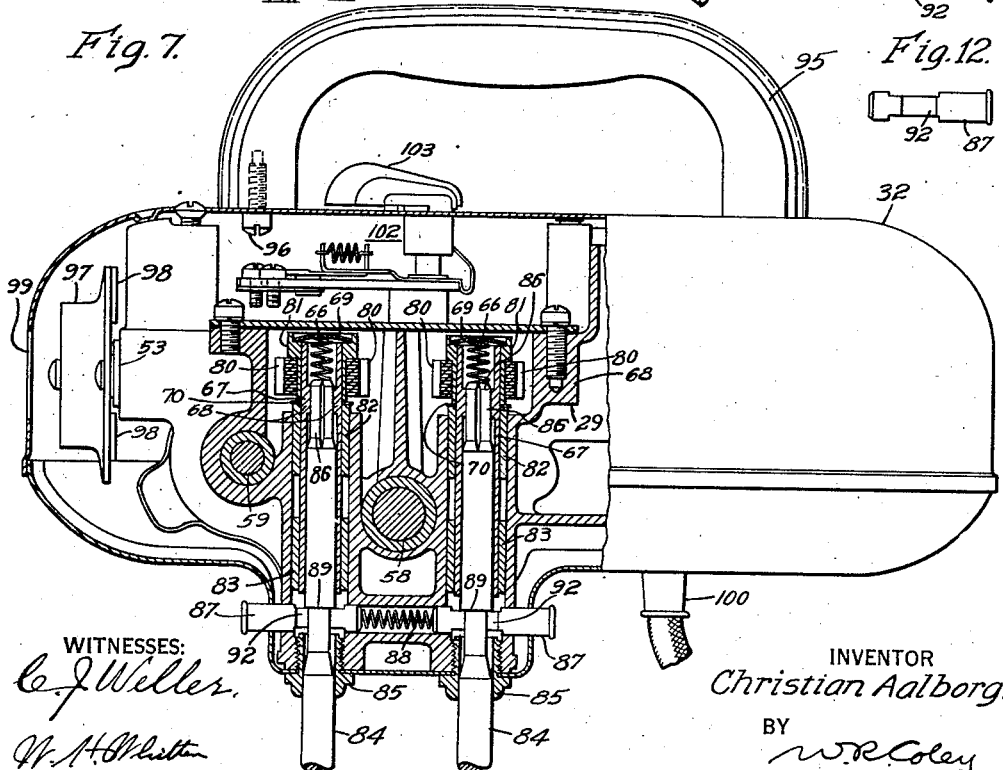
WITNESSES:
INVENTOR
Christian Aalborg.
BY
ATTORNEY Aug. 8, 1939. C. AALBORG 2,169,014
FOOD MIXER
Filed May 27, 1936   6 Sheets-Sheet 6
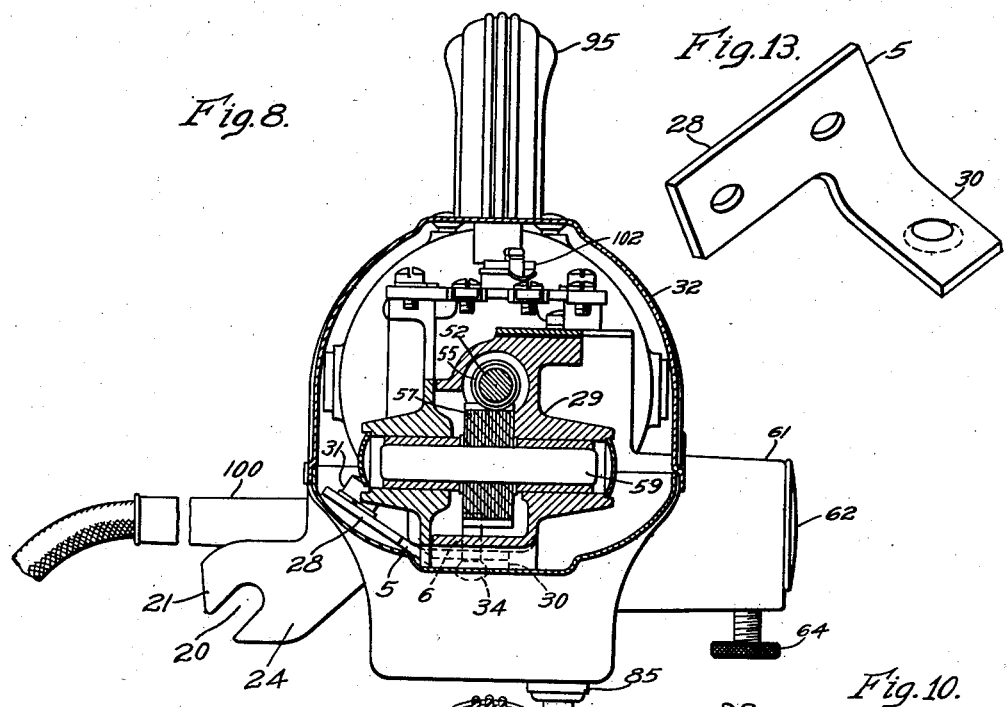
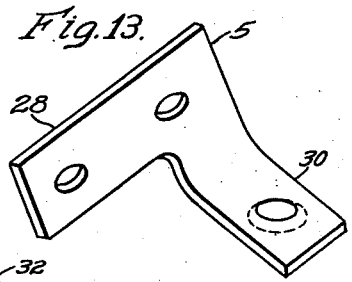
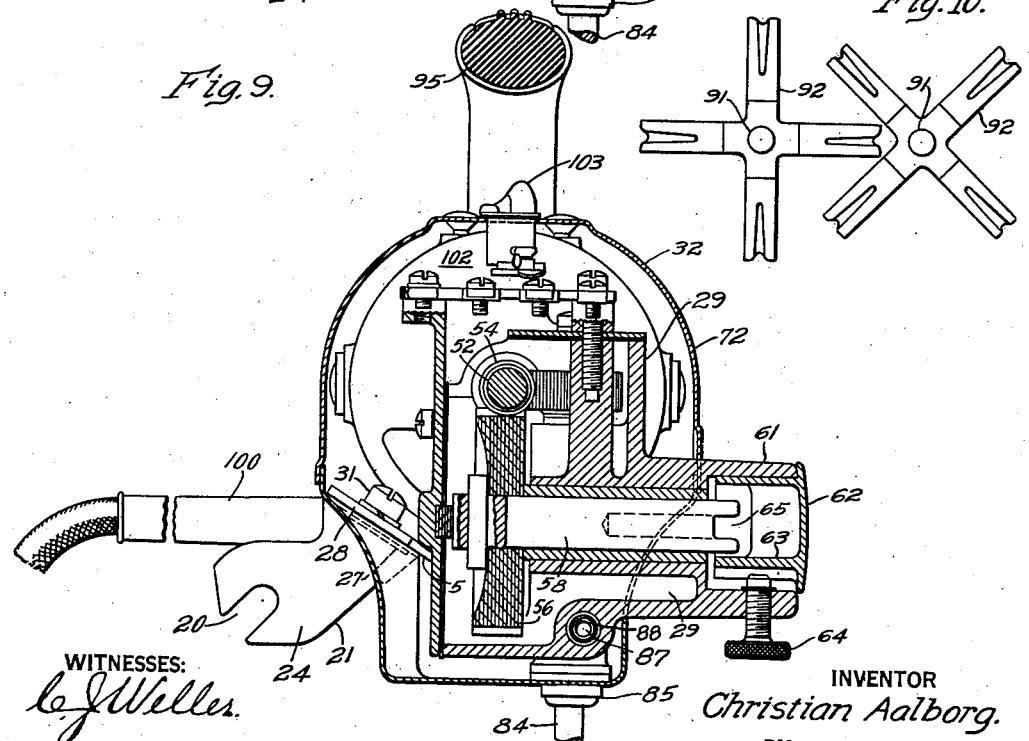
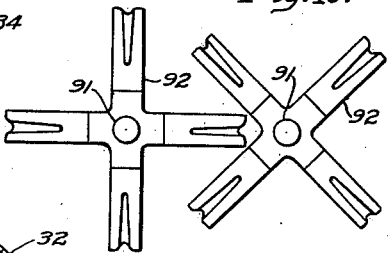
INVENTOR
Christian Aalborg.
BY
W. R. Coley
ATTORNEY Patented Aug. 8, 1939

2,169,014

UNITED STATES PATENT OFFICE 2,169,014

FOOD MIXER

Christian Aalborg, Springfield, Mass., assignor to Westinghouse Electric & Manufacturing Company, East Pittsburgh, Pa., a corporation of Pennsylvania Application May 27, 1936, Serial No. 82,064

14 Claims. (Cl. 259—84)

This invention relates to domestic utensils and particularly to a motor driven food mixer for kitchen use.

It is an object of this invention to provide a device of the type mentioned which shall be more artistic in appearance and more compact in the arrangement of its parts, of lighter weight and cheaper to produce than devices of this class heretofore have been.

It is a further object of this invention to provide a device which is less likely to tip over when in use and of sturdier strength than heretofore.

It is a further object of this invention to provide a food mixer in which beaters may be used of greater diameter relative to the bowl than heretofore, without preventing the rotation of the bowl and yet causing complete and rapid mixture of the contents.

It is a further object of the invention to provide a beating mechanism and a cooperating bowl support for the use of different sizes of bowls in which the beaters will be effective over a larger area of the large bowl at any one moment than heretofore.

It is a further object of this invention to provide a power device enclosed by an envelope from which only those parts protrude, access to which must be had in the manipulation of the device.

It is a further object of this invention to mount such a power device on a standard arising from near the edge of the base in such manner that the power unit may be moved into either of two positions. In connection with this object of the invention, it is contemplated to provide a handle on the envelope and to support the envelope from the power device instead of the power device from the envelope.

It is a further object of my invention to locate the motor shaft in a direction new and different from its location heretofore. This is one reason why the resulting device is more compact and why the moment of the weight of the power device about the standard is small and the device less likely to tip over.

It is a further object of this invention to provide more working space than in former food mixers between the beaters and the side of the bowl remote from the standard. This as accomplished by the new location of the motor shaft.

It is a further object of this device to provide a fruit juicer which is readily detached from the power device, quickly and easily placed in position and more convenient to use than heretofore.

It is a further object of the invention to secure the fruit juicer in position when connecting it to power, so that, when in use it will stay in a position in which the spout will deliver into the receptacle provided for it.

The two positions into which it is contemplated that the power device may be moved include one for operating the beaters in the bowl and the other for driving a fruit juicer mounted above the mixer. The beater driving position is one in which the power may also be used for driving various attachments such as a food chopper or the like.

It is a further object of this invention to provide a device in which strong pressure may be exerted upon the working tool of the fruit juicer without creating any great turning moment about the center of the standard.

It is a further object of this device to equip the base with a turn-table and to so arrange the parts that a large bowl may be worked upon the turn-table or a small bowl upon the base without the turn-table, without requiring an enlargement of the base for this purpose.

It is a further object of this invention to so arrange the apparatus that the base required will be smaller than has heretofore been necessary.

It is a further object of this device to provide a motor in line with a worm shaft of a reduction gear and thereby avoid any awkward angles in the apparatus as a whole.

It is a further object of this invention to provide beaters and detachable operating connections for the beaters in such relation to the power unit that when it is turned into the position in which the fruit juicer is to be used, the beaters will be outside the bowl.

It is also an object of this feature of the device to provide a safety arrangement in which the fruit juicer cannot be used when the beaters are attached to the power unit because the spout of the fruit juicer will be in the way of the beaters in this position, thus preventing the possibility of clothing, for example, being caught in the rapidly whirling beaters.

It is a further object of this invention to enclose the power unit in a casing, to provide a fan for drawing air through the casing and to provide the casing with openings through which the air may enter and emerge.

It is a further object of the invention to provide a means for driving auxiliary food-preparing apparatus without building into the power unit any additional parts.

Other objects of the invention and details of the construction will be clear from the following detailed description and the accompanying drawings, in which:

Fig. 6 is a section on the line VI—VI of Fig. 5;

Fig. 7 is a section on the line VII—VII of Fig. 5;

Fig. 8 is a section on the line VIII—VIII of Fig. 6;

Fig. 9 is a section on the line IX—IX of Fig. 6;

Fig. 10 is a bottom plan view of the beaters;

Fig. 11 is a detailed view showing a top plan of the fastening device for the beater shaft;

Fig. 12 is a side elevation of the same detail; and

Fig. 13 is an enlarged prospective view of a bracket shown in Fig. 8 and others.

The food mixer includes a base 1 at one end of which a standard 2 extends upwardly. The base is also equipped with feet 3 and 4 which are of any desired form. The food 4 is somewhat higher and, if desired, larger than the feet 3, in order that it may better support the standard. The base, feet and standard are preferably made in a single casting, which may be a die casting, and are made hollow in order to economize weight.

Figure 3:
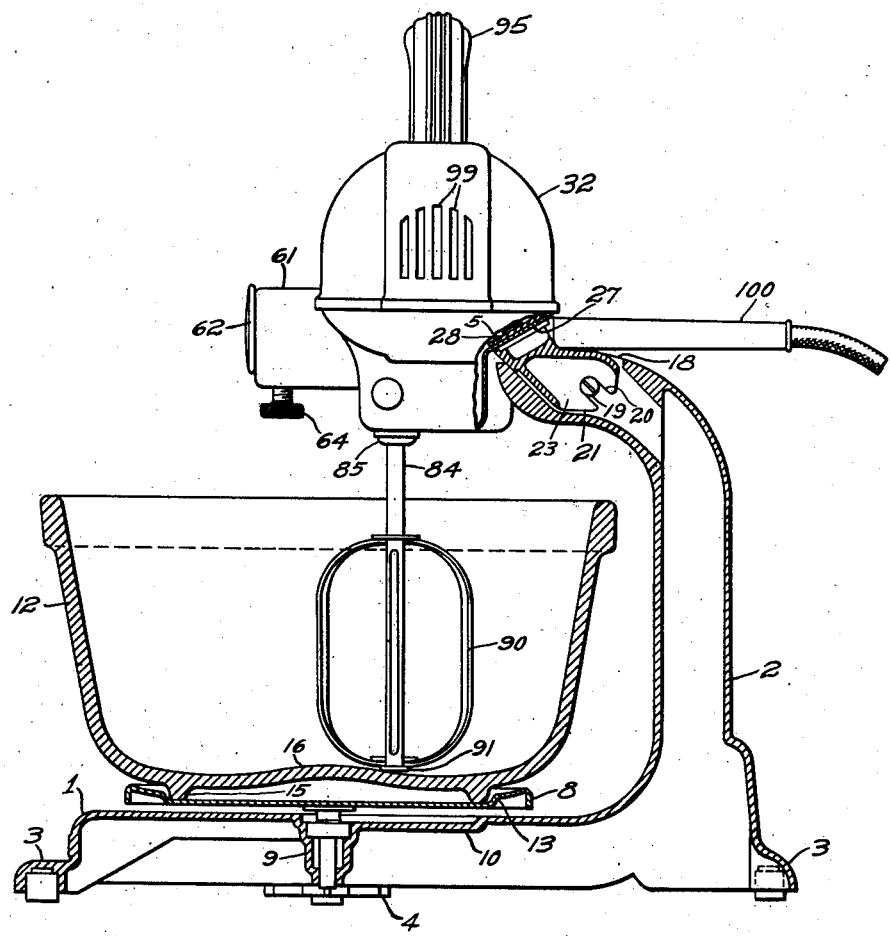
Fig. 3 is an elevation of the device in a different position, looking in the direction opposite to that of Fig. 1 and in which the lower parts are shown in section.
Figure 4:
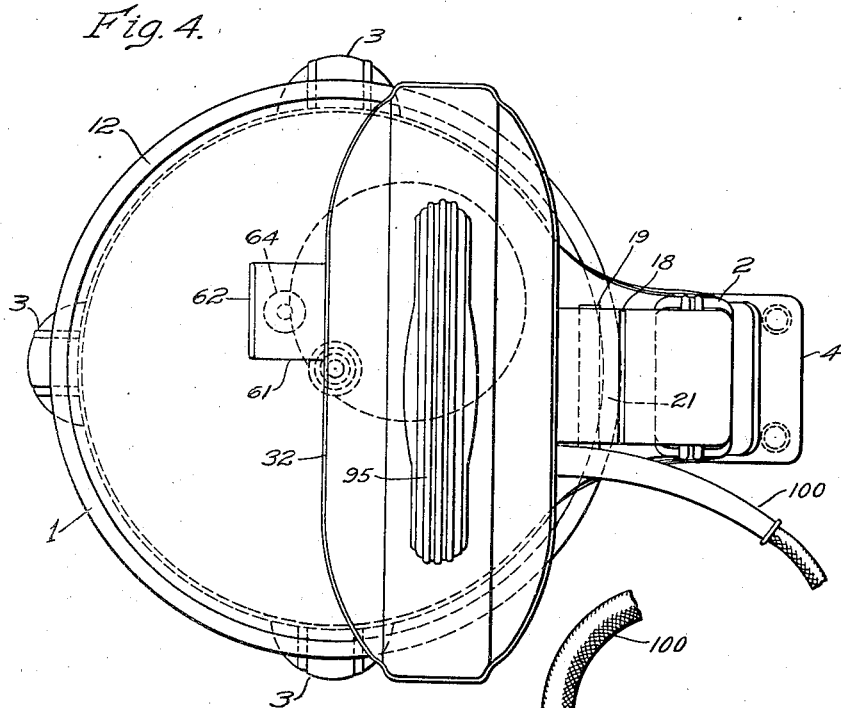
Fig. 4 is a top plan view of the apparatus, the power unit being in the position shown in Fig. 3.

A turn-table 8 (Fig. 3) is mounted above the base 1, preferably by means of a spindle supported in suitable bearings 9. The base is also equipped with a depressed portion 10 which forms the seat for a small bowl 11 shown in Fig. 1. In Fig. 3, the bowl 12, which is larger than the bowl 11, is shown seated in a depression 13 in the turn-table. The bearing 9 and the center of the seat 10 are in a line which makes an angle with the line connecting the center of the base 1 to the center of the standard 2.

The bowl 12 is equipped with an annular ridge 15 on the bottom (see Fig. 3) which cooperates with the depression 13 in the turn-table 8. A small elevation 16 is shown in the middle of the bottom of the bowl, this being a standard commercial bowl, but, with the provisions recited herein, this elevation is not needed and the bottom of the bowl may be flat or of any shape provided in bowls produced commercially.

The standard 2 is hollow and its uppermost portion is deflected toward the base and has an orifice 18. A pin 19 is provided in this part of the standard and extends across the hollow interior. The pin 19 traverses a notch 20 in the hinge 21. The hinge 21, like the standard 2, is hollow and it is provided with side surfaces, one of which, 23, cooperates with a similar side surface in the standard 2 to afford a firm rest for the hinge member in the position illustrated in Fig. 3.

The opposite side portion 24 of the hinge 21 fills the opening 18. Also, when the hinge is in the position illustrated in Fig. 1, the end of the side portion 24 abuts against the interior of the deflected portion of the standard 2 and affords a stop. The exterior of the portion 24 in the position shown in Fig. 1 abuts against the edge of the opening 18 in the standard 2 and adds to the solidity of the stop in this position of the hinge.

The hinge or bracket 21 extends out of the standard 2 and on the end its edges are recessed as shown at 27, Fig. 3, see also dotted lines in Fig. 9, to afford a support for a washer or cushion. The end 27 of the hinge 21 cooperates with a plate 28 which is part of a bracket 5. Screws 31 through the plate 28 enter threaded holes in the end of the hinge 21 to secure them together thus fastening the bracket 5 to the bracket 21.

The motor support 29 and the various parts carried thereby are enclosed within an envelope 32. At the point of support, the envelope 32 is reenforced with a plate 30 which is part of the bracket 5 and the motor support 29 is provided with a flat thickened portion 6. A cushion 33 of felt, fiber, cork or rubber is located between the plate 30 and the flat portion 6. A screw 34 through the envelope 32 and plate 30 is threaded into the portion 6 and serves to secure the envelope 32 in place. If desired, the envelope 32 may be secured to its contents at various other points. The parts within the envelope 32 are secured to and supported by the motor support structure 29.

In the upper part of the casting 29, as shown in Fig. 6, are portions pierced by ducts containing wicks which deliver oil to bearings 51 and 53. Between these portions the casting has a flat part constituting a platform upon which a switch for controlling the speed of the motor is mounted. A shaft extending upward from this to the outside of the envelope 32 is connected to a switch manipulating handle near one of the ends of the main handle 95.

The structure 29 includes spacers or struts 35 extending from the central part thereof toward the right in Fig. 6. The struts 35 serve to position a plate 36 which is part of the field structure of a motor 40. The field comprises laminations 41 built up in the usual way and fastened to the plate 36 and the plate 42. The plate 42 positions the bracket 49 in proper relationship. Field windings shown at 43 and 43' in Fig. 6 magnetize the laminations 41. Two coils are provided for the field windings and the space in the stator which is between the two coils is occupied by bolts 47 best shown in Fig. 5. The bolts 47 extend through the laminations and into lugs 48 on the motor support 29 which contains the brush rigging and abut against the struts 37 on the casting 29. By tightening the bolts 47, the laminations are compressed and the whole field is supported against the struts 35.

Figure 5:
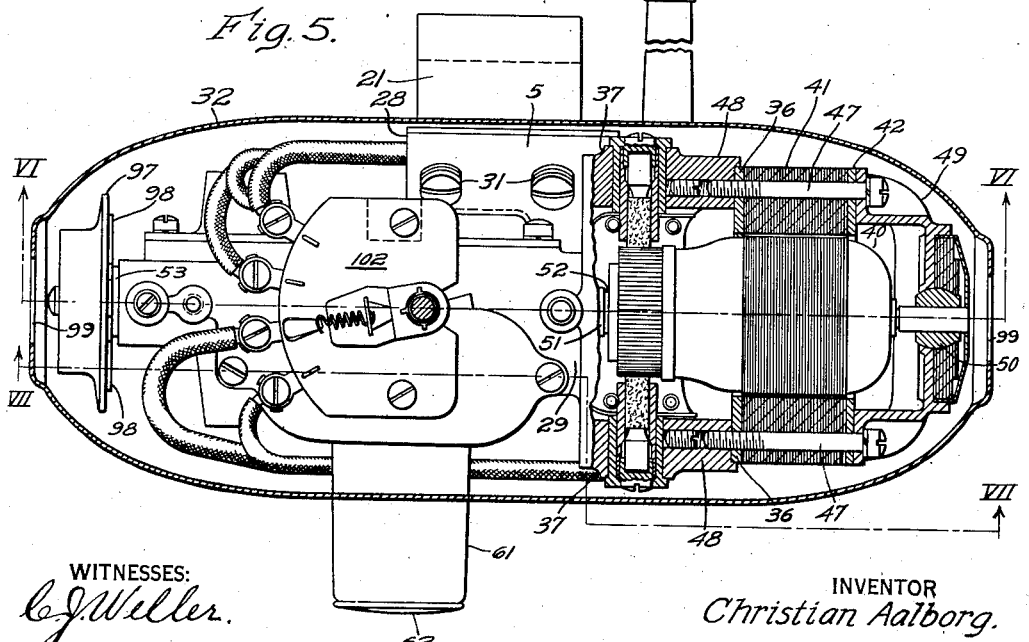
Fig. 5 is a plan view of the power unit with the upper portion of the envelope removed and the motor shown in section.

At the right-hand end of the motor, as seen in Figs. 5 and 6, brackets are provided. They are secured to the field structure by the bolts 47 and they support a bearing 50 including oil-soaked packing and a device for holding the same in contact with the bearing proper.

The bearing 51 for the other end of the motor shaft is formed directly in the motor support 29 from which the struts 35 emerge. The rotor of the motor 40 is supported in the bearings 50 and 51, and the motor shaft 52 continues toward the left, and is supported finally in a bearing 53 also directly in the casting 29 as best shown at the left of Fig. 6.

The motor shaft 52 is equipped with two worm threads 54 and 55. The pitch of these is the same in magnitude but opposite in sense. Two worm wheels 56 and 57 are mounted to mesh with the two worms 54 and 55, and therefore, rotate in opposite senses. As shown in Fig. 6, the worms engage the upper sides of each of these worm wheels and the wheels 56 and 57 thus have the same peripheral speed. They mesh with each other as is shown at the upper left-hand part of wheel 56 in Fig. 6.

The wheel 56 is mounted on a shaft 58 and the wheel 57 is mounted on a shaft 59, both of which are supported in holes in the casting 29 and are most clearly shown in Fig. 7. These holes are transverse to the motor shaft 52 and not in a plane through it.

The wheel 56, as shown in Fig. 6, meshes with the worm 54 on the motor shaft 52. The wheel 57 receives its power from the motor shaft 52 through a different worm 55 and the two wheels together deliver power to the shaft 58, which emerges from the envelope 32 through a stud 61 extending from the casting 29 to the exterior of the envelope. Resistance to turning the shaft 58 produces equal and opposite end thrusts on shaft 52. These cancel each other so that no resultant end thrust is produced. No additional power is delivered to shaft 58 because of two driving wheels instead of one. The shaft 58, as shown in Fig. 9, extends beyond the envelope 32 but not as far as the end of the stub 61. The stub is closed by a cap 62 having a skirt 63 which may be contacted by the end of a set screw 64 provided in the side of the stud 61. The end of the shaft 58 is hollow as is shown at 65. The hollow may be any out-of-round shape but preferably is a slot 65 across the end of the shaft which is continuous with a hole extending longitudinally of the shaft and concentric therewith.

Figure 1:
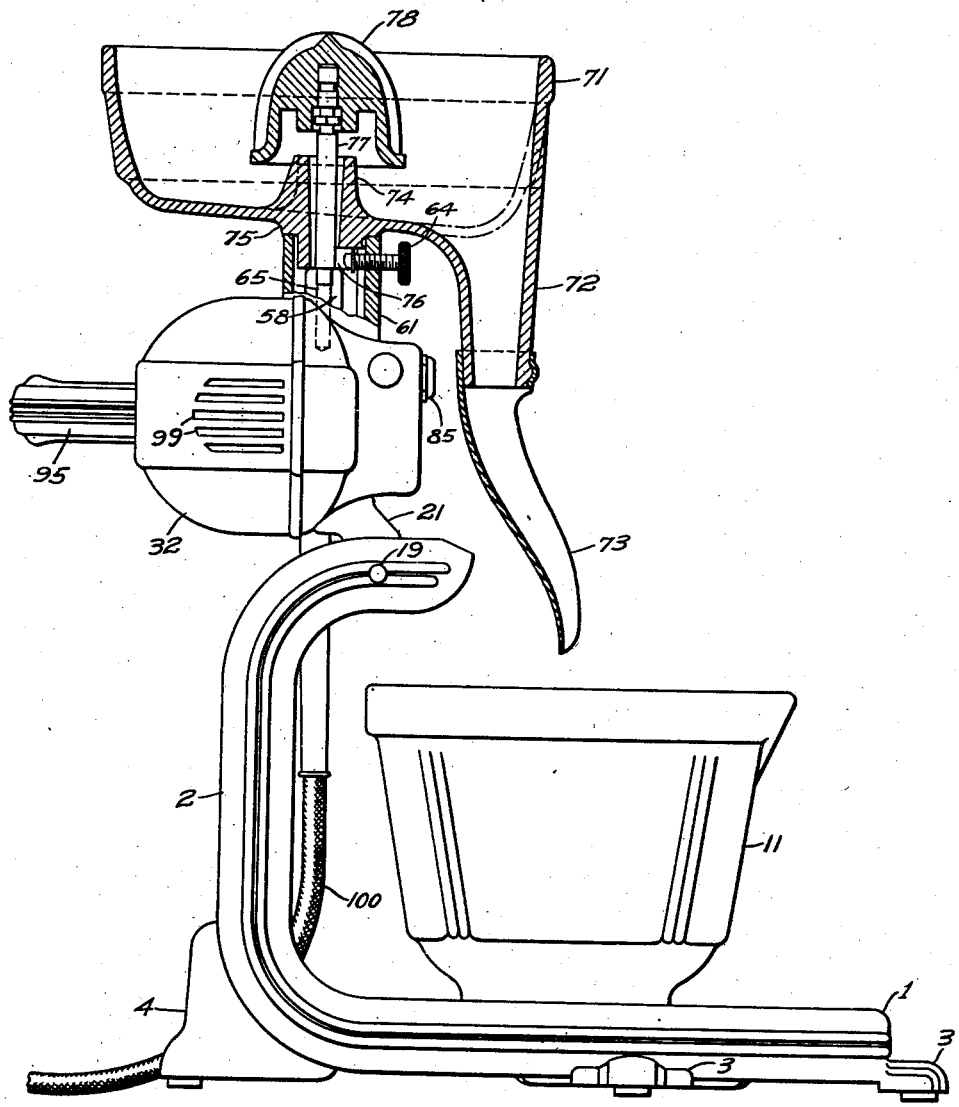
Figure 1 is an elevation of the device, the upper part thereof being shown in section.

The juicer comprises a dish 71, Fig. 1, equipped with a spout 72 provided with a metallic elongation 73. At the center of the bottom of the dish 71 it has a hollow boss 74 on the inside and a hollow stub 75 on the outside the hollow of which aligns with the hollow of the boss 74. The stub 75 has a shoulder beyond which it continues with smaller diameter. The smaller part of stub 75 is recessed at one side as shown at 76 to accommodate the set screw 64.

With the motor in the position shown in Fig. 1, the stub 61 is vertical. If the set screw 64 is loosened the cap 62 may be removed. The juicer may then be placed on the stub 61 so that the boss 75 is in line with the stub 61. When this is done the smaller part of the boss will enter the stub. The dish 71 may then be rotated until the recess 76 coincides with the set screw 64, and the boss 75 can then enter the stub 61 until the edge of the stub meets the shoulder. If desired, the set screw may then be tightened but this is not necessary. Finally, the reamer or juicing tool 78 may be put in place by inserting the shaft 77 through the hollow of the boss 74 and stub 75, causing its lower end to enter the hole in the shaft 58. The reamer should then be rotated until a lug on one side of the shaft 77 will be in position to enter the slot 65 at one side of the axis of shaft 58, then it may be thrust further down and the lug will cause shaft 77 to rotate with shaft 58.

The worm wheels 56 and 57 are in the same plane and mesh with the worms 54 and 55 on the same side thereof. On another side of the shaft 52, two worm wheels 80 (Fig. 7) mesh with the worms 54 and 55, respectively. The worm wheels 80 do not mesh with each other. Also, they are of smaller diameter than the worm wheels 57 and 56 and thus rotate more rapidly.

One worm wheel 80 is mounted upon a hollow shaft 81 which has a coaxial recess containing a spring 66. The shaft 81 has fitted to the interior thereof a sleeve 67 which has thickened places 68 making that part of the interior of square cross section.

A shaft 84 is provided which can be inserted into a bore or bearing in the casting 29 in line with said sleeve 67. The upper end of shaft 84 has a square extension 86 preferably made of resilient parts which when thrust into the square space made by the thickened places 68 will be forced together and frictionally hold the shaft 84 from falling out by gravity or being forced out by spring 66. The square cross section of the cooperating part of sleeve 67 cooperates with resilient parts 86 to cause gear 80 to rotate shaft 84. The bore or tubular opening in casting 29 opens into a larger interior opening which houses the gear 80 and the portion of the shaft 52 in mesh therewith.

When the gear 80 rotates it drives the shaft 81 having a press fit thereon. The shaft 81 has a close fit (it may be a press fit) on the upper end of sleeve 67 and therefore when gear 80 rotates, sleeve 67 rotates also. Sleeves of bearing material 82 and 83 at intervals along the tubular opening in casting 29 afford guidance for sleeve 67 and so for shaft 84. A washer 70 between the rotating shaft 81 and the first of these guiding bearings 82 is made of anti-frictional material and so further reduces resistance to the rotation of shaft 84.

Also, because these parts are of solid material, no lubricant emerges from this bearing onto the lower portion of the shaft 84. The entry of foreign material into the tubular housing for shaft 84 is prevented by a collar 85 where the shaft emerges.

At the top, the interior of sleeve 67 is closed by a cap 69 held in place by the flange on the top of shaft 81. This prevents oil or grease from entering from the worm gear.

At the bottom, the collar 85 retains within the bore in casting 29 any dirt produced by the action of the anti-friction materials.

To assemble these parts, the shaft 84 is thrust into the tubular opening until the square part 86 enters the square part of the interior of the sleeve 67. It is then retained in this position by the lock member 87 which is spring pressed by the spring 88 and so engages a shoulder 89 upon the shaft 84. The lock consists of a plunger 87 having a notch 92 which when coaxial with the tubular opening will permit the shaft 84 to pass by. In any other position of the plunger 87 the part of plunger near the notch 92 will cooperate with the shoulder 89 to support the shaft 84.

There are two shafts 84 extending from the two gears 80 which mesh with the two worms 54 and 55 upon the shaft 60. The description given above will apply to each shaft.

The bottoms of the shafts 84 are equipped with beaters 90 as shown in Figs. 3 and 10. The beaters comprise two or more loops of strip or ribbon-like metal, preferably resilient, mounted on shafts 84. The height of the loops is sufficient to reach above the level to which the bowl would be filled in use and the diameter of them is great enough to make the width of the intermeshing combination exceed the radius of the larger bowl. Because of this height, if by any accident a beater with its shaft is dropped into the bowl, a part of it will always be above the batter where it can be removed without getting the operator's fingers into the batter. Because of the width, quick and complete mixing of the whole batter is secured, irrespective of the shape of the bottom of the bowl, since the width of batter being mixed at any moment is greater than half its total width.

The ribbon is equipped along each vertical part of each loop with a groove, preferably convex, toward the interior of the loop. By actual tests, it has been found that this shape makes the beaters more efficient (by throwing the batter into them) than plain ribbon or ribbon grooves convex outwardly. The grooves extend nearly but not quite to the heads 91 and nearly but not quite to the corresponding heads at the tops of the loops. At these points, the ribbon is ungrooved in order not to interfere with the heads or rub against the bowl. Because the worms 54 and 55 are of opposite pitch, the beaters 90 rotate in opposite senses, with the result that the proximate arms of the beaters move in the same direction through the contents of the bowl.

At the bottom of the shaft 84, a head 91 has been produced which forms a bearing surface against the bottom of the bowl. The edges of these heads which are farthest apart move in opposite directions over the bottom of the bowl and their results, therefore, cancel one another. But the edges of the heads which are nearest each other act upon the bottom of the bowl in the same sense and their effects upon the bowl are additive. As a result, the bowl will rotate, turning the table 8 about the bearing 9. The effect of the beaters 90 upon the contents of the bowl has a similar result.

The shaft 84 below the shoulder 89 is smaller for some little distance. Even when the lock member 87 is in operative position, it will not prevent movement of shaft 84 upward. If the beaters are made to press against the bottom of the bowl, they and their shafts 84 may be forced toward the casting 29, thus compress the springs 66, and these springs in turn cause the beaters to press against the bottom of the bowl. The height of the standard 2 and the length of shafts 84 are so chosen that said pressure is normally present.

The envelope 32 has a handle 95 secured to it by screws 96. The location of this handle, as best seen in Fig. 7, is on the opposite side of the envelope 32 from the shafts 84. When it is desired to turn the housing 32 from the position illustrated in Figs. 1 and 2 to the position illustrated in Fig. 3 or vice versa, the handle 95 may be grasped and the housing 32 and the contents thereof may be rotated about the pin 19 as an axis from the one position to the other.

When the movement is to the position of Fig. 1, the shafts 84 and beaters 90 will come to a position above the bowl and extending away from the standard 2. They will, therefore, enter the region which is occupied by the spout 72. Therefore, they cannot be used in this position and must be removed before the dish 71 with its spout is put in place. This has the advantage that the operator cannot rotate the beaters unintentionally when meaning to work the fruit juicer. Accidents as a result of the operator introducing her fingers or clothing into the space occupied by the beaters are thereby rendered impossible.

At the end of the motor shaft opposite the motor, a fan wheel 97 is mounted. This consists of a hollow cylinder having only an open top and a laterally extending flange around its bottom. Blades 98 extend spirally from the open top to the flange and from ridges transverse to the flange. The fan 97 will draw air into the envelope 32 through the left-hand end thereof, as seen in Fig. 6, and deliver it through the right-hand end. Slits 99, best shown in Fig. 3, are provided to accommodate this movement of the air.

In the operation of the device, assuming the parts to be in the position shown in Fig. 3, the material to be mixed is put in the bowl 12. The bowl is placed in position on the turntable 8, the handle 95 having been manipulated to bring the beaters into the position shown, which is at the bottom of the bowl. Current is then turned on and enters through the power conductor 100 to the motor 40. The distribution of this current between motor and field and the consequent speed of the motor is controlled by the switch 102 which is worked from the handle 103.

As the motor rotates, it drives the shaft 52 which rotates the worms 54 and 55. It also rotates the fan 97. The rotation of the fan draws air through the slots 99 and causes it to emerge through the slots at the other end of the casing 32. It also drives the worm wheels 56 and 57. Because of the action of these worm wheels on each other and on the worms on the shaft 52, no end thrust is introduced into the shaft 58 or gears 80.

The shaft 52 also drives the gear wheels 80 and thus drives the shafts 84 in opposite directions which causes the beaters 90 to rotate in opposite senses. This, as already explained, sets up a tendency to rotate the bowl 12 partly by the differential action of the heads 91 against the bottom of the bowl and partly by the action of the material in the bowl against the bowl, this motion of the contents of the bowl being set up by the beaters. As a result, the bowl 12 rotates, driving the turntable 8.

If during this action the operator desires to distribute the action of the beaters differently throughout the contents of the bowl, the beaters may be rotated about the pivot 19 as an axis by manipulating handle 95. In doing this, the beaters should not be raised above the level of the top of the bowl, since otherwise material might be splashed out of the bowl. If it is desired to mix a smaller quantity of material, the larger bowl and turntable may be removed, a smaller bowl may be positioned upon the seat 10 in the base 1 and the beaters introduced thereby manipulating the handle 95.

If it is desired to use the apparatus to work the juicer instead of to mix the contents of a bowl, the power if on is first turned off and the handle 95 is moved until the housing 32 is in the position illustrated in Fig. 1. The locks 87 are then pushed and the shafts 84 thereby released. The beaters and shafts 84 are then removed. When about to be withdrawn, they are in a horizontal position extending toward the right in Fig. 1.

After they are out of the way, the juicer dish 71 may be put in place in a way already described. Its spout 72 and the prolongation 73 thereof can occupy the position shown in Fig. 1 because the beaters are no longer in that place. To insert the dish 71, the set screw 64 is loosened, if it was tight, and the cap 62 withdrawn. The boss 75 is then inserted into the end of the stub 61 in a way already described. The reamer 78 is then placed in the center of the dish with the shaft 77 entering through the stub 74 into the recess 65 in the shaft 58. The lug on the shaft 77 enters the slot 65 and so insures that the shaft 77 and the shaft 58 will move together.

Power is then turned on with the result that the shaft 58 is driven by the motor 40 from the shaft 52 through the worms and the worm wheels 56 and 57. The shaft 58 rotates the shaft 77 and this rotates the reamer 78. A half of a fruit is pressed by hand against the reamer 78 which causes the juice to be extracted into the bowl 71 and flow down the spout 72 and flow or drip from the extension 73 into the bowl.

Figure 2:
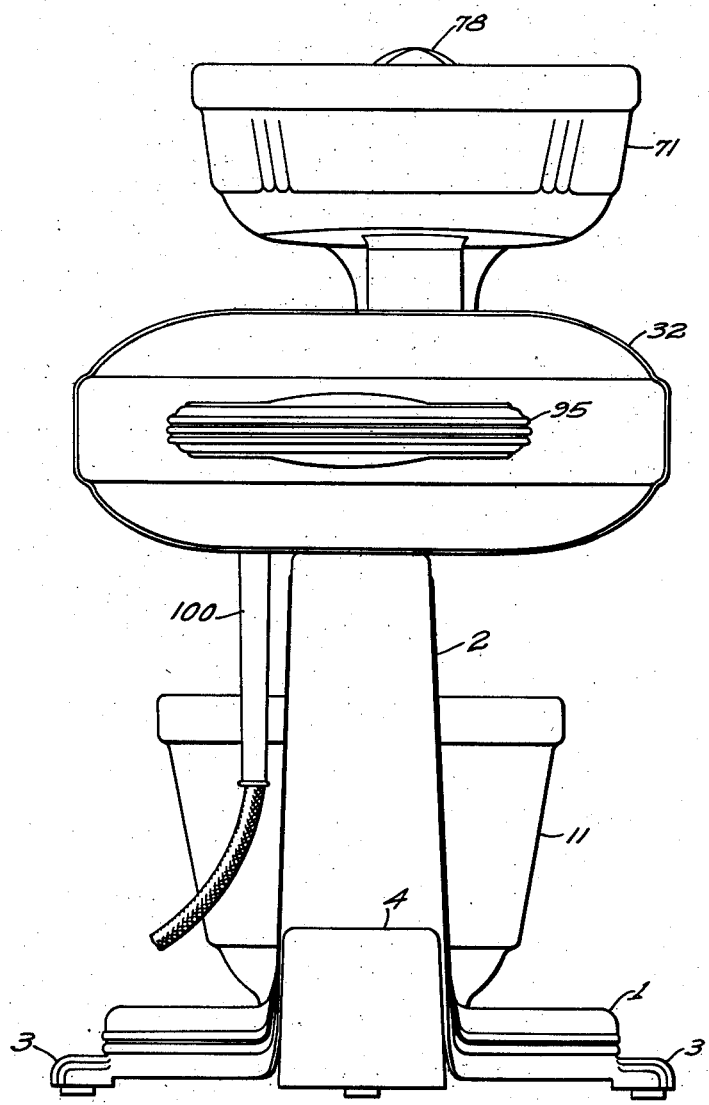
Fig. 2 is an elevation of the device looking at the end having the standard.

The vertical pressure exerted against the reamer 78 is very nearly in line with the standard 2. The greatest distance between the line of the reamer 78 and that of the standard is shown in Fig. 2 to be small. Consequently, considerable pressure may be exerted on the fruit in the juicer without any danger of overturning the device.

If it is desired to drive some other apparatus, such as a vegetable slicer or a meat chopper, the juicer is removed and the motor unit turned down to its position shown in Fig. 3, and the auxiliary apparatus is connected to the power unit by joining the shaft of the auxiliary apparatus to the shaft 58 by any desirable separable connection, preferably a connection analogous to the connection used with shaft 77. Thus provision for driving auxiliary apparatus is made without building into the food mixer any additional shaft or gearing for this purpose or utilizing any auxiliary gear unit, such as the "power stand" of the prior art.

The gearing through worm wheels 57 and 56 affords a different gear ratio from that through wheels 80. The shaft 58, therefore, rotates at a lower speed than the shaft 84, which lower speed is suitable for the juicer or the auxiliary apparatus. The beaters rotate at a speed too high for this purpose.

Many modifications in the details of this device will occur to those skilled in the art and the specific details illustrated and described are not to be taken as a limitation. No limitation is intended except those expressly stated in the claims.

I claim as my invention:

1. In a food mixer, a standard, chambered support secured thereto, a gearing housed in said support, whereby said support constitutes a gear casing for said gearing, a motor having a stator and a rotor disposed on the opposite side of said support from said gearing, a support for said stator secured to said gear casing, two bearings for said rotor, one of which constitutes part of said gear casing, and a support for the other secured to said stator.

2. In a food mixer, a standard, chambered support secured thereto, a gearing housed in said support, whereby said support constitutes a gear casing for said gearing, a motor having a stator and a rotor, a support for said stator secured to said gear casing, two bearings for said rotor, one of which constitutes part of said gear casing, and a support for the other secured to said stator, an envelope enclosing said gearing, gear casing and motor supported from said support, said stator support being distinct from said support, and a handle secured to said envelope.

3. In a food mixer, a standard, a gear casing hingedly supported from said standard, a motor supported from said gear casing, an auxiliary shaft, means mounted in said gear casing by which said motor drives said auxiliary shaft, an envelope distinct from the support of said gear casing and enclosing said gear casing and motor, said auxiliary shaft projecting through said envelope to the exterior thereof, a handle mounted on said envelope by which the hinge may be actuated to bring said auxiliary shaft to an upright position.

4. In a food mixer, a motor, beaters, driving connections from the motor to the beaters, including a worm shaft, a worm wheel connected to a beater and meshing with the worm on one side thereof, a second worm wheel having a different speed from the beaters and meshing with said worm at a point substantially at right angles to the first-mentioned meshing, and an appliance-attaching shaft driven by said second worm wheel.

5. In a food mixer, a motor, beaters, driving connections from the motor to the beaters, including a worm shaft, a worm wheel, a shaft driven thereby and connected to a beater and meshing with the worm on one side thereof; a second worm wheel meshing with said worm on a different side thereof and in a different plane, an envelope, an auxiliary shaft from the second worm wheel, each of said worm wheel shafts having a junction member by which it may be connected to a cooperating junction member outside said envelope, said envelope being rotatable and connected to the enclosed parts whereby they may be rotated as a unit to bring the plane of one worm wheel into the former position of the plane of the other worm wheel, and the beater shaft or the auxiliary shaft into a selected direction.

6. In a food mixer, a base, a supporting structure above said base, a motor secured to the supporting structure at one end thereof, gearing supported within said supporting structure and a fan supported at the opposite end of said structure, an envelope enclosing but not supporting said supporting structure and the parts supported thereby, said envelope comprising an upper part and a lower part joined by a seam and having dome shaped end portions, the whole forming a cigar shaped body.

7. In a food mixer, a base, a turn-table rotatably mounted thereon, a seat on the turn-table for a bowl, and a seat in the base shaped for a different bowl and non-concentric with the said seat on the turn-table.

8. In a food mixer, a base, a standard thereon, a turn-table rotatably mounted thereon, driving mechanism carried by the standard, beater means driven thereby, a seat on the turn-table to position a bowl operatively with respect to said beater means, and a seat in the base to position a different bowl operatively with respect to said beater means, said seats being non-concentric.

9. In a food mixer, a base, an upwardly extending standard at one side of said base, a motor supported from said standard on the side thereof toward the base, said motor having a shaft therein transverse to the plane including said standard and the center of said base, beater shafts extending downwardly toward said base and driving connections from said motor shaft to said beater shafts, said driving connections being outside said motor and on the opposite side of said plane therefrom and said beater shafts being on the same side of said plane as said driving connections.

10. In a food mixer, a shaft, two worms thereon having pitches of opposite sense, worm wheels, one cooperating with each worm, said worm wheels being geared together whereby resistance to the rotation thereof introduces end thrusts into the shaft in opposed directions, and beater shafts driven from said worms independently of said worm wheels.

11. In a food mixer, a shaft, two worms thereon having pitches of opposite sense, two sets of worm wheels, each set including two worm wheels, one meshing with each worm, the sets being in different planes, the worm wheels of one set being geared together, a shaft for said set driven from said worms through the geared worm wheels, and the worm wheels of the other set being disconnected except by the worm shaft, two shafts for said other set each being driven by a worm wheel of said set.

12. In a food mixer, a base, a standard near one side thereof, a motor, power mechanism driven thereby and supported from said standard intermediate the ends of said mechanism, said support including a hinge having an axis extending substantially parallel to the axis of said motor, a shaft driven by said mechanism and extending away from said hinge whereby when said hinge is operated the direction of said shaft and also its distance from the standard are altered.

13. In a food mixer, a base, an upright standard near one side thereof, a support extending from said standard toward the base and including a hinge, an encased mechanism supported intermediate its length by said hinge, a shaft extending from said mechanism in a direction which in one extreme position of the hinge is approximately parallel to the base and in the other extreme position of the hinge is upward, a fruit juicer including a reamer, a shaft for operating the reamer, and means for connecting said reamer shaft to the first-mentioned shaft, whereby when the hinge is in the position which brings said first-mentioned shaft upward, a down thrust on said reamer will have a small moment about the center of said upright.

14. In a food mixer, a base, a standard at one side thereof, a hinge on said standard, a supporting structure mounted on said hinge, a gear train housed by said supporting structure on one side of said hinge and a motor supported from said supporting structure on the other side of said hinge whereby said motor, gear train and supporting structure are arranged along a line substantially parallel to the axis of said hinge, an appliance-attaching shaft normally extending from said gear train substantially parallel to said base and away from said standard but occupying a substantially vertical position when said motor, gear train and supporting structure are turned around said hinge.

CHRISTIAN AALBORG.